(12) United States Patent
Takeda et al.

(10) Patent No.: US 8,367,194 B2
(45) Date of Patent: Feb. 5, 2013

(54) ROUND FIBER-REINFORCED PLASTIC STRAND, MANUFACTURING METHOD THEREOF, AND FIBER-REINFORCED SHEET

(75) Inventors: Toshikazu Takeda, Tokyo (JP); Masaki Shimada, Tokyo (JP); Hidehiko Hino, Tokyo (JP); Masaki Arazoe, Tokyo (JP)

(73) Assignee: Nippon Steel Composite Co., Ltd., Tokyo (JP)

( * ) Notice: Subject to any disclaimer, the term of this patent is extended or adjusted under 35 U.S.C. 154(b) by 613 days.

(21) Appl. No.: 12/529,736

(22) PCT Filed: Mar. 10, 2008

(86) PCT No.: PCT/JP2008/054834
§ 371 (c)(1),
(2), (4) Date: Sep. 3, 2009

(87) PCT Pub. No.: WO2008/111679
PCT Pub. Date: Sep. 18, 2008

(65) Prior Publication Data
US 2010/0009116 A1 Jan. 14, 2010

(30) Foreign Application Priority Data
Mar. 12, 2007 (JP) ................. 2007-062522

(51) Int. Cl.
*D04H 1/00* (2006.01)
*B29D 28/00* (2006.01)
*B32B 19/00* (2006.01)
*D02G 3/00* (2006.01)

(52) U.S. Cl. ............ 428/292.1; 428/357; 428/364; 428/395; 264/103

(58) Field of Classification Search .......... 263/103; 428/294.1, 357, 364, 369, 375, 385, 386, 428/391, 392, 395
See application file for complete search history.

(56) References Cited

U.S. PATENT DOCUMENTS
4,876,143 A 10/1989 Sugita et al.

FOREIGN PATENT DOCUMENTS
| | | |
|---|---|---|
| JP | 63-012786 A | 1/1988 |
| JP | 8-039680 A | 2/1996 |
| JP | 8-090656 A | 4/1996 |
| JP | 2004-197325 A | 7/2004 |
| JP | 2006-069188 A | 3/2006 |

OTHER PUBLICATIONS

Decision of Allowance issued Feb. 29, 2012 in CN Application No. 200880007911.X.

*Primary Examiner* — Camie Thompson
(74) *Attorney, Agent, or Firm* — Panitch Schwarze Belisario & Nadel LLP

(57) ABSTRACT

It is an object of the present invention to provide round fiber-reinforced plastic strand, a manufacturing method thereof, and a fiber-reinforced sheet which eliminate limitation in forming speed and limit on number of products capable of being manufactured at a time, do not require use of a release agent, eliminate the necessity of operations such as roughing after forming, and thus permit a considerable reduction of the manufacturing cost and a remarkable increase in the product quality. The manufacturing method of the round fiber-reinforced plastic strand of the present invention comprises (a) a step of continuously feeding reinforcing fiber bundles f1 each comprising a plurality of reinforcing fibers arranged in a direction while twisting the reinforcing fiber bundles f1; (b) a step of impregnating the reinforcing fiber bundles f1 fed continuously with a matrix resin R; and (c) a step of heating the resin-impregnated reinforcing fiber bundles f2 while tensioning to a prescribed intensity, thereby forming the reinforcing fiber bundle into a circular cross-section and hardening the resin, and manufactures a fiber-reinforced plastic strand 2 having a circular cross-section.

14 Claims, 8 Drawing Sheets

ROUND FIBER-REINFORCED PLASTIC STRAND, MANUFACTURING METHOD THEREOF, AND FIBER-REINFORCED SHEET

CROSS-REFERENCE TO RELATED APPLICATION

This application is a Section 371 of International Application No. PCT/JP2008/054834, filed Mar. 10, 2008, which was published in the Japanese language on Sep. 18, 2008 under International Publication No. WO 2008/111679 A1, and the disclosure of which is incorporated herein by reference.

BACKGROUND OF THE INVENTION

1. Field of the Invention

The present invention relates to a small-diameter, round fiber-reinforced plastic strand, a manufacturing method thereof, and a fiber-reinforced sheet in which such fiber-reinforced plastic strands are arranged in a sheet shape. Particularly, the fiber-reinforced sheet is applicable for bonding, for reinforcement, to, for example, a concrete structure or a steel structure which is a civil-engineering structure (in the present specification, such structures including a concrete structure and a steel structure are simply referred to as "structure").

2. Description of the Related Art

For the purpose of reinforcing a structure, a bonding process of attaching or winding continuous fiber-reinforced sheets onto or around the surface of an existing or a new structure has recently been developed.

This bonding process is however only simple bonding. A limitation is imposed on reinforcing effect of the ultimate bearing force because of early destruction of structure caused by peeling of FRP (fiber-reinforced plastics) reinforcing members, and furthermore, the cracking inhibiting effect of, for example, a concrete structure has its limits. In addition, high performance of FRP reinforcing materials is not effectively utilized in many cases. Cracking damages in existing structures cannot be restored or structures cannot be reinforced against a dead load.

To solve these problems, a process known as the strained bonding process is now applied in practice, comprising the steps of achieving a tensioned state by inputting a load onto a sheet-shaped reinforcing member, and bonding the sheet-shaped reinforcing member in the tensioned state to the structure surface. The sheet-shaped reinforcing member used in this strained bonding process is a sheet in which fibers not impregnated with a resin are arranged in a direction, known as a reinforcing fiber sheet, or a fiber-reinforced plastic flat plate having a width lager than 50 mm.

However, in a fiber-reinforced sheet using fibers not impregnated with a resin, the reinforcing fibers are not always arranged uniformly in a direction because of the problems in manufacture or in handling. As a result, partial thread breakage occurs upon tensioning a fiber-reinforced sheet by imparting a load to introduce a tensioning force, and this may prevent from introducing a sufficient tensioning force. In other words, the fiber-reinforced sheet cannot sometimes display a force necessary for tensioning. The tensioning force is usually reduced by about 50 to 30% of the final breaking force.

When using a fiber-reinforced plastic flat plate, a large sheet width tends to cause a problem upon bonding in that it is difficult to obtain a sufficient adhesive strength due to mixture of voids onto the joint surface. In order to avoid occurrence of voids, a conceivable counter-measure is to provide holes in the fiber-reinforced plastic sheet. This is not, however, preferable since holes would cut reinforcing fibers of the fiber-reinforced plastic flat plate.

The present inventors have therefore proposed a fiber-reinforced sheet, as disclosed in Japanese patent application laid-open No. 2004-197325, in which a plurality of continuous fiber-reinforced plastic strands, impregnated with a matrix resin and cured, are arranged in the longitudinal direction in a blind shape, and these strands are then fixed by a fixing fiber material.

Such a fiber-reinforced sheet permits solving the problem of thread breakage upon tensioning, avoidance of occurrence of voids upon execution, thereby ensuring a sufficient adhesive strength for the surface to be reinforced, and particularly makes it possible to accomplish reinforcement of a concrete structure based on the strained bonding process at a very high workability.

It has been the usual and conventional practice to manufacture a round continuous fiber-reinforced plastic strand used in the aforementioned fiber-reinforced sheet by the application of a pultrusion forming process known as the pultrusion process.

In this process, however, a problem is encountered in that use of a heating die for forming a round strand causes generation of resistance during passage of strands through the die, thus preventing from raising the forming speed. Another problem is that the size limitation of die imposes a limit in the number of holes to be provided in the die, limiting the number of strands capable of being manufactured at a time to 20 to 30 strands.

The process suffers from still another problem in that a release agent is used for preventing sticking of the matrix resin and the die, and outflow of the release agent onto the strand surface prevents smooth bonding of the adhesive and the strand surface when bonding the strand to a structure, when using the strand as a sheet-shaped reinforcing member (fiber-reinforced sheet) for reinforcing the structure. This causes further another problem that, when using the fiber-reinforced sheet, surface roughing should be carried out with sand paper or the like after curing of the strand.

These problems have caused an increase in the manufacturing cost, and a decrease in quality due to flawing of strands upon surface roughing.

SUMMARY OF THE INVENTION

It is accordingly an object of the present invention to provide a round fiber-reinforced plastic strand, a manufacturing method thereof, and a fiber-reinforced sheet which permit elimination of limit on the forming speed or on the number of strands manufactured at a time, do not use a release agent, eliminate the necessity of operations after forming such as surface roughing, and permit a large reduction of the manufacturing cost and a considerable increase in the product quality.

It is another object of the present invention to provide a round fiber-reinforced plastic strand, a manufacturing method thereof, and a fiber-reinforced sheet which permit forming into a round shape without the need for a heating die, make it possible to manufacture many products at a time, and thus are more favorable than the strands based on the pultrusion method in cost as well as in quality.

The above-mentioned objects are achieved by the round fiber-reinforced plastic strand, the manufacturing method thereof, and the fiber-reinforced sheet of the present invention. In summary, according to a first embodiment of the present invention, there is provided a manufacturing method of a round fiber-reinforced plastic strand for manufacturing a fiber-reinforced plastic strand having a circular cross-section, comprising:
(a) a step of continuously feeding reinforcing fiber bundles each comprising a plurality of reinforcing fibers arranged in a direction while twisting;
(b) a step of impregnating the thus continuously fed reinforcing fiber bundles with a matrix resin; and
(c) a step of curing the resin into a circular cross-section reinforcing fiber bundles by heating the thus resin-impregnated reinforcing fiber bundles at a prescribed tension.

According to a second embodiment of the present invention, there is provided a manufacturing method of a round fiber-reinforced plastic strand for manufacturing a fiber-reinforced plastic strand having a circular cross-section, comprising:
(a) a step of continuously feeding reinforcing fiber bundles each comprising a plurality of reinforcing fibers arranged in a direction;
(b) a step of impregnating the thus continuously fed reinforcing fiber bundles with a matrix resin;
(c) a step of twisting the reinforcing fiber bundles impregnated with the resin; and
(d) a step of heating the reinforcing fiber bundles impregnated with the resin and twisted as described above while tensioning to a prescribed tension to cure the resin with a circular-cross-section of the reinforcing fiber bundles.

According to an embodiment of the present invention, the aforementioned fiber-reinforced plastic strand has a diameter from 0.5 to 3.0 mm.

According to another embodiment of the present invention, the number of twists of the aforementioned reinforcing fiber bundles is from 5 to 40 twists/m.

According to another embodiment of the present invention, the resin-impregnated reinforcing fiber bundle is tensioned with strength of 500 g/piece(bundle) to 3,000 g/piece (bundle).

According to still another embodiment of the present invention, the amount of impregnation of the matrix resin relative to the aforementioned reinforcing fiber is from 30 to 60% in volume ratio.

According to further another embodiment of the present invention, the aforementioned fiber is any of glass fiber, carbon fiber, aramid fiber, PBO (polyphenylenebenzbisoxazole) fiber, and polyester fiber.

According to another embodiment of the present invention, the aforementioned matrix resin is any of epoxy resin, vinylester resin, MMA resin, unsaturated polyester resin, and phenol resin.

According to a third embodiment of the present invention, there is provided a round fiber-reinforced plastic strand which is a round fiber-reinforced plastic strand comprising a plurality of reinforcing fibers arranged in a direction, wherein bundles of the plurality of reinforcing fibers are impregnated with a resin, having a circular cross-section;
wherein the aforementioned fiber-reinforced plastic strand is a fiber-reinforced plastic strand manufactured by a manufacturing method having the above-mentioned configuration.

According to a fourth embodiment of the present invention, there is provided a fiber-reinforced sheet which is a sheet-shaped reinforcing material for reinforcing a structure by bonding thereto, in which reinforcing fibers are impregnated with a matrix resin; a plurality of cured and continuous fiber-reinforced plastic strands are arranged in a blind shape in the longitudinal direction; and strands are fixed to each other by a fixing fiber material;
wherein the above-mentioned fiber-reinforced plastic strand is a fiber-reinforced plastic strand manufactured by a manufacturing method having the above-mentioned configuration. According to an embodiment of the present invention, the above-mentioned fiber-reinforced plastic strands are spaced apart from each other by 0.1 to 1.0 mm. According to another embodiment, the aforementioned fixing fiber material is in a thread-shaped material comprising glass fiber or an organic fiber.

According to the present invention, a round-shaped strand can be manufactured without the need for a die, by imparting a tensile force to the reinforcing fiber upon heating for curing the resin-impregnated reinforcing fiber, by twisting the reinforcing fibers and controlling the amount of resin impregnation of the matrix resin.

According to the present invention, furthermore, because of the elimination of the need for a die, it is possible to manufacture more than 30 strands at a time, and because of the unnecessity to add a release agent into the matrix resin, the necessity for a surface roughing of the strand is eliminated, thus permitting a large cost reduction and improvement of quality.

DESCRIPTION OF THE PREFERRED EMBODIMENTS

The manufacturing method of the fiber-reinforced plastic strand of the present invention, the fiber-reinforced plastic strand manufactured by this manufacturing method, and the fiber-reinforced sheet manufactured by use of the manufactured strand will now be described in detail with reference to the drawings.

Embodiment 1

Figure 1:
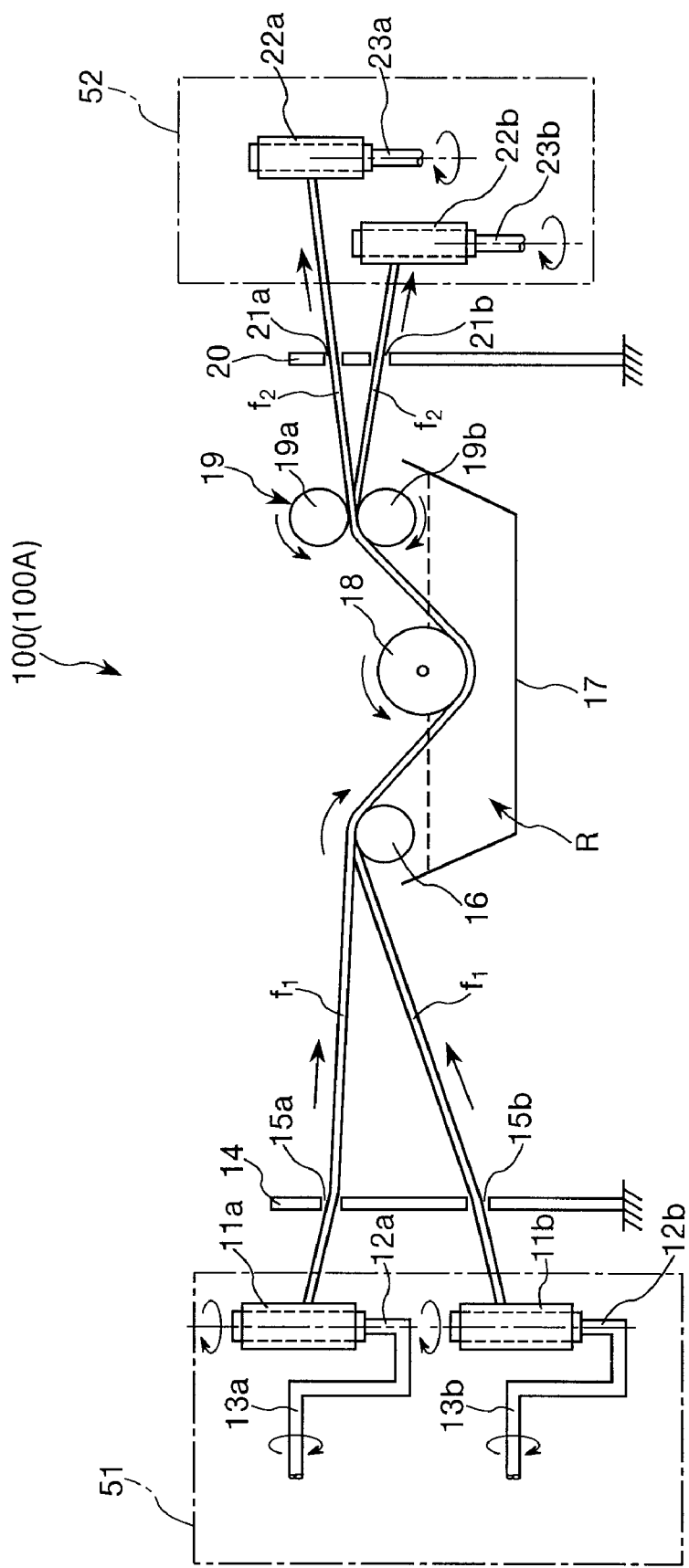
FIG. 1 is a schematic configuration view of the manufacturing equipment for describing an embodiment of the manufacturing method of a fiber-reinforced plastic strand of the present invention.
Figure 2:
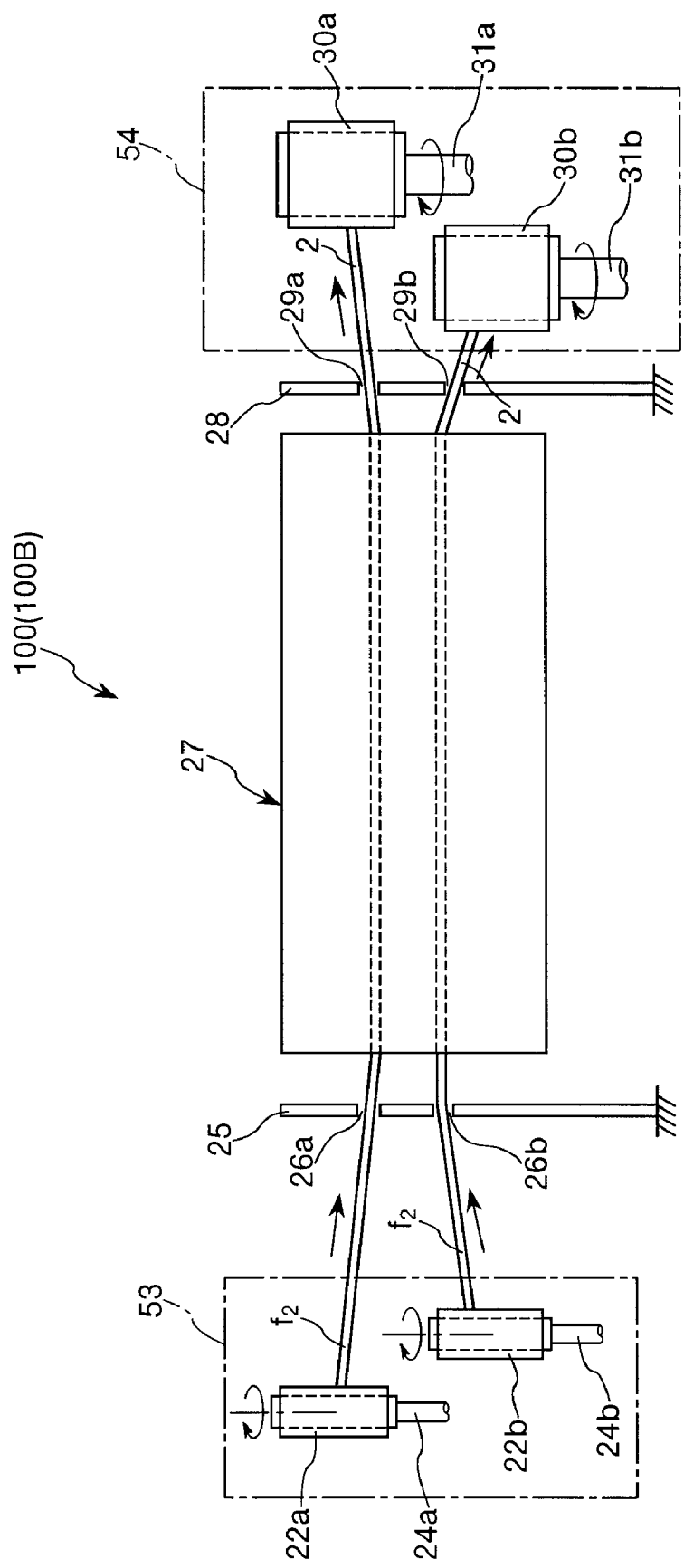
FIG. 2 is a schematic configuration view of the manufacturing equipment for describing an embodiment of the manufacturing method of a fiber-reinforced plastic strand of the present invention.
Figure 3:
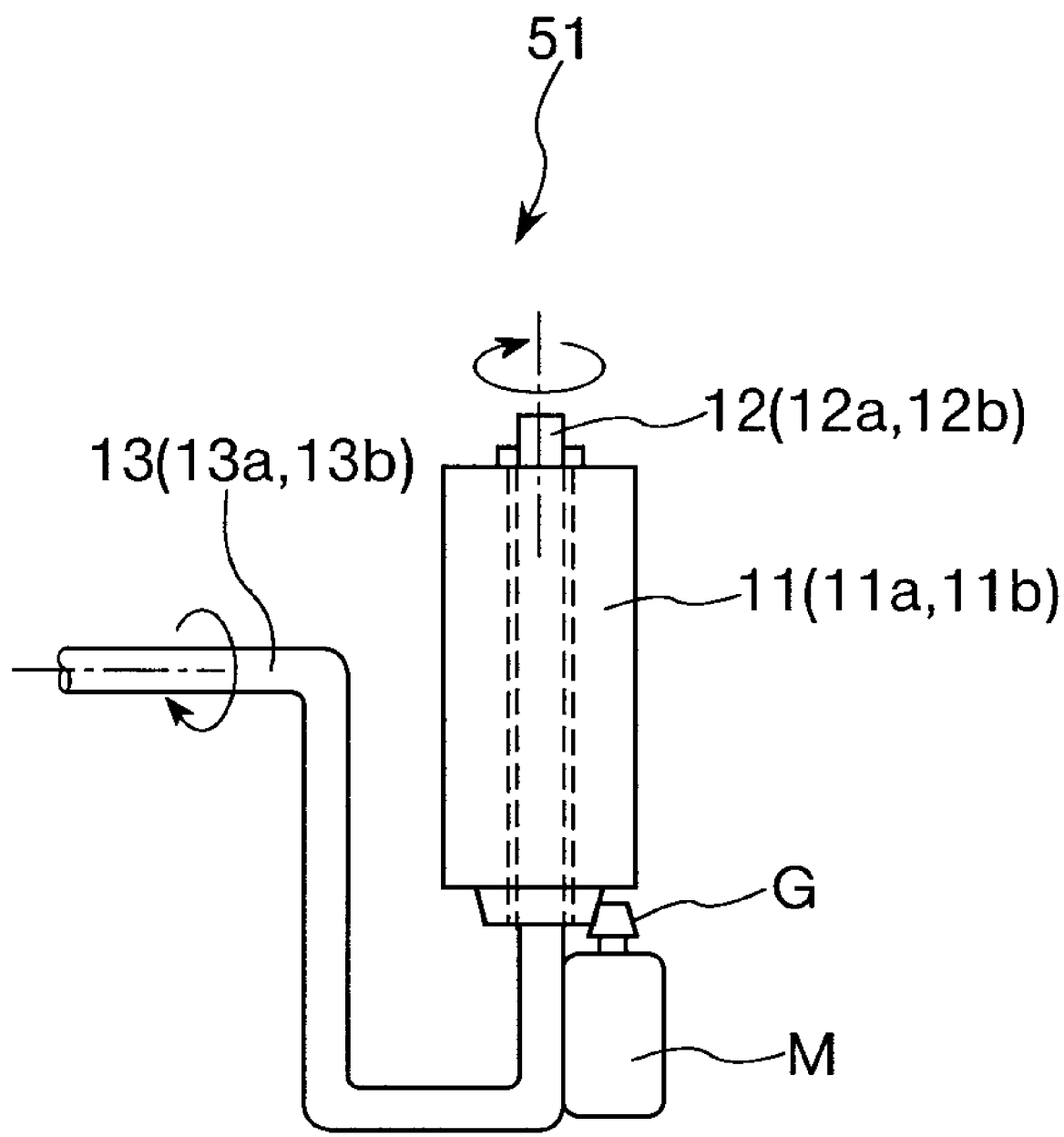
FIG. 3 is a schematic configuration view for describing operation of the delivery bobbin in the manufacturing equipment for explaining an embodiment of the manufacturing method of a fiber-reinforced plastic strand of the present invention.
Figure 4:
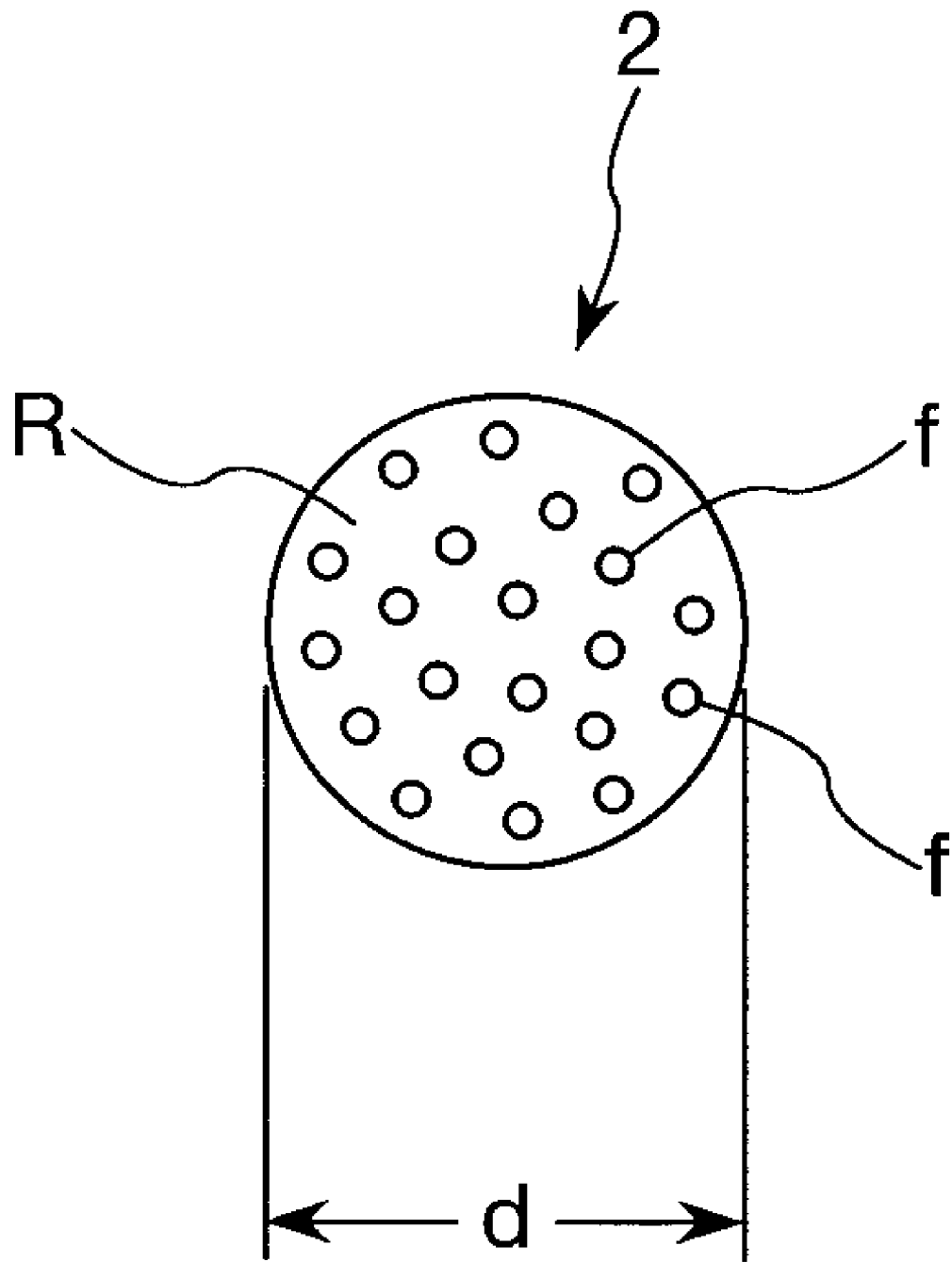
FIG. 4 is a sectional view of a fiber-reinforced plastic strand comprising the fiber-reinforced sheet of the present invention.

An embodiment of the manufacturing equipment 100 (100A and 100B) for manufacturing the fiber-reinforced plastic strand of the present invention is illustrated in FIGS. 1 to 3. FIG. 4 shows a sectional structure of the fiber-reinforced plastic strand manufactured in accordance with the present invention, and FIG. 5, an embodiment of the blind-shaped fiber-reinforced sheet using such a fiber-reinforced plastic strand.

In this embodiment, the manufacturing equipment 100 (100A and 100B) is composed of a fiber-feeding/resin-impregnation/winding section 100A (FIG. 1) and a fiber-tensioning/heating-curing section 100B (FIG. 2).

FIG. 1 illustrates the fiber-feeding/resin-impregnation/winding section 100A of the manufacturing equipment 100, in which, in the drawing, a reinforcing fiber strand (reinforcing fiber bundle) f1 comprising a plurality of reinforcing fibers f moves from left to right, during which a twisting processing and resin impregnation are carried out.

FIG. 2 illustrates the fiber-tensioning/heating-curing section 100B of the manufacturing equipment 100, in which, in the drawing, the reinforcing fibers f2 subjected to twisting processing and resin impregnating step move from left to right, and the resin is cured under a prescribed tension.

Description will now be made further in detail. In the fiber-feeding/resin-impregnation/winding section 100A, a plurality of, two in this embodiment, delivery bobbins (cylindrical thread spool) 11 (11a and 11b) for fiber feeding are prepared, and a reinforcing fiber strand (reinforcing fiber bundle) comprising a prescribed number of collected reinforcing fibers f not as yet impregnated with a resin is wound on each bobbin 11.

The reinforcing fiber bundles f1 wound around each bobbin 11 are continuously fed to the resin impregnation step where a resin impregnating tank 17 is arranged. At the same time, the reinforcing fiber bundles f1 are twisted (reinforcing fiber bundle feeding—twisting processing step).

In other words, the reinforcing fiber bundles f1 fed to the resin impregnation step are impregnated in the resin impregnating tank 17 with a resin, and the resin-impregnated reinforcing fiber bundles f2 are wound onto the winding bobbins 22 (22a and 22b) while twisting (resin impregnation—twisting processing step).

In the fiber-tensioning/heating-curing section 100B shown in FIG. 2, the resin-impregnated and twisted reinforcing fiber bundles f2 are delivered from the bobbin 22, introduced into a heating-curing furnace 27 and heated for curing. The heated and cured reinforcing fiber bundles, i.e., the fiber reinforced plastic strand 2 is wound onto winding bobbins 30 (30a and 30b). Heating-curing processing is carried out in a state in which a prescribed tension is applied to the resin-impregnated reinforcing fiber bundles f2 (reinforcing fiber bundle tensioning/heating-curing step).

The above-mentioned step will now be described further in detail.

(Reinforcing Fiber Bundle Feeding/Twisting Processing Step)

As will be understood more clearly with reference to FIG. 3, in this embodiment, the two bobbins 11 (11a and 11b) are attached to rotating shafts 12 (12a and 12b) provided in the delivery device 51, and the rotating shafts 12 are rotatably attached to main rotating shafts 13 (13a and 13b) of the delivery device.

Each bobbin 11 (11a or 11b) turns around the rotating shaft 12 (12a or 12b) of the bobbin 11 (11a or 11b) by means of a driving motor M and a gear transmitting mechanism G, thus delivering the reinforcing fiber bundle f1 wound around the bobbin 11 (11a or 11b). At the same time, each bobbin 11 (11a or 11b) is rotated around the main rotating shaft 13 (13a or 13b) along with the rotation around the rotating shaft 12 (12a or 12b) while rotating around the rotating shaft 12 (12a or 12b) as described above.

That is, the bobbin 11 rotates around the rotating shaft 12, and simultaneously, around the main rotating shaft 13, thus delivering the reinforcing fiber bundle f1.

The reinforcing fiber bundle f1 delivered from the bobbin 11 is guided by guide holes 15 (15a and 15b) and introduced into the resin impregnating tank 17 by an entry guide roll 16.

Under the effect of the above-mentioned configuration, the reinforcing fiber bundle f1 fed to the impregnation step including the resin impregnation tank 17 is fed in a twisted form.

The number of twist turns provided per m can be controlled by adjusting the number of revolutions of the bobbin 11 around the main rotating shaft 13 and the delivery speed of the reinforcing fiber bundle f1.

According to this embodiment, as described later more in detail, the fiber-reinforced plastic strand should preferably have a diameter of from 0.5 to 3.0 mm. Therefore, as the reinforcing fiber bundle f1 to be fed to the impregnation step, for example, when using carbon fiber as the reinforcing fiber, a carbon fiber strand (carbon fiber bundle) f1 comprising a collection of 3,000 to 48,000 carbon fibers (filaments) each having a diameter of 6 to 10 μm is used.

The number of twists of the reinforcing fiber bundle should preferably be 5 to 40 twists/m. This will be described later further in detail.

(Resin Impregnation Step)

The impregnating tank 17 contains a matrix resin R, and an entry guide roller 16 guiding the reinforcing fiber bundles f1 is arranged as described above at the entry of the impregnating tank 17. An impregnating roller 18 is arranged in the impregnating tank 17, and exit guide roller pair 19 (19a and 19b) are arranged at the exit of the impregnating tank 17.

The entry guide roller 16 has a role of arranging in order a plurality of fibers f composing the reinforcing fiber bundle f1 to be fed to the impregnating tank 17 before impregnation in the step of impregnating the reinforcing fiber bundles f1.

The impregnating roller 18 has a role of forcedly impregnating the reinforcing fiber bundles f1 with the resin R and is used in a state in which at least the lower half of the roller is dipped in the resin R contained in the tank 17.

The exit guide roller pair 19 (19a and 19b) have a function of stripping off the reinforcing fiber bundle f2 impregnated with the resin. During the stripping operation, the amount of resin deposit is controlled.

That is, the amount of resin impregnated into the reinforcing fiber bundle is controlled by controlling the pressing pressure of the upper and the lower rollers 19a and 19b.

In this embodiment, the amount of impregnation of the matrix resin relative to the reinforcing fiber f should preferably be 30 to 60% in volume ratio. This will be described later more in detail.

The reinforcing fiber bundles f2 impregnated with resin are guided through the guide holes 21 (21a and 21b) formed in the guide 20, and wound around the winding bobbins 22 (22a and 22b) in the winding device 52.

The individual winding bobbins 22 are rotation-driven around the respective rotating shafts 23 (23a and 23b).

The bobbins around which the resin-impregnated reinforcing fiber bundles f2 are wound, are detached and fed to the heating-curing step in the fiber-twisting/heating-curing section 100B as shown in FIG. 2.

(Tensioning-Heating-Curing Step)

Referring to FIG. 2, in the twisting/heating-curing section 100B the bobbins 22 (22a and 22b) having wound up the resin-impregnated reinforcing fiber bundles in the aforementioned winding device 52 are installed on the rotating shafts 24 (24a and 24b) of the delivering device 53. In other words, the winding bobbins 22 function as delivery bobbins in the tensioning-heating-curing step.

The uncured reinforcing fiber bundles f2 impregnated with resin and subjected to twisting processing, wound on the delivery bobbins 22 are delivered by causing rotation of the bobbins 22 around the rotating shafts 24 (24a and 24b). The reinforcing fiber bundles f2 are introduced into the heating-curing furnace 27 via the guide 25, and wound onto the winding bobbins 30 (30a and 30b) of the winding device 54.

Description will now be made further in detail. Functions of an electromagnetic brake and the like are imparted to this delivery device 53, enabling it to provide the uncured resin-impregnated reinforcing fiber bundles f2 delivered from the bobbins 22 with an appropriate tensile force.

More specifically, it is possible to a circular cross-sectional shape of the reinforcing fiber bundle f2, i.e., a round shape by giving an appropriate tensile force to the twisted and non-cured resin-impregnated reinforcing fiber bundle f2 in the resin-curing step in the heating-curing furnace 27 under the effect of the aforementioned configuration.

In the present specification and claims, the term "circular" shall mean to include substantial circles within the range of diameter ratio from 1.0 to 1.5 in a longitudinal and transverse directions on the cross-section.

Furthermore, by imparting an appropriate tensile force to the reinforcing fiber bundles to tension the reinforcing fibers f forming bundles uniformly as far as possible, it is possible to stabilize the quality such as strength of the fiber-reinforced plastic strand 2 available after curing.

This embodiment has, as described above, a configuration in which unhardened reinforcing fiber bundles f2 are delivered while applying an electromagnetic brake to the delivered bobbins 22, and the resin is cured in the heating-curing furnace 27 while applying an appropriate tensile force between the delivery bobbins 22 and the winding bobbins 30.

In this embodiment, a strength of 500 to 3,000 g/piece (bundle) should preferably be imparted to the resin-impregnated reinforcing fiber bundle f2 as the tensioning force. This will be described later in detail.

The resin-impregnated fiber f2 already subjected to twisting processing and not as yet cured, to be delivered from the delivery bobbins 22 is guided by the guide holes 26 (26a and 26b) formed in the guide 25, and continuously fed to the heating-curing furnace 27.

Each delivery bobbin 22 is rotation-driven around the respective rotating shafts 24 (24a and 24b).

The heating-curing furnace 27 is basically a closed structure except for the entry and the exit, has a heater function or a hot blast circulation function in the interior, and can heat the resin-impregnated reinforcing fibers f2.

The resin impregnated on the resin-impregnated fibers f2 is cured in this furnace at an appropriate temperature for a certain period of time. The temperature and the time period in the heating-curing furnace 27 depend upon the kind of the impregnated resin.

Therefore, by increasing the length of this curing furnace 27, the manufacturing speed of fiber-reinforcing plastic strand can be raised and a higher productivity than in the method based on a die described later can be achieved.

In the die process described later, the hole for passing the resin-impregnated reinforcing fiber f2 can be prepared only on the two-dividing surface between upper and lower halves. The number of products capable of being manufactured at a time depends therefore upon the die width, and this makes the die process a low-efficiency manufacturing process.

In the method of this embodiment, on the other hand, it is possible to arrange and pass resin-impregnated reinforcing fibers f2 by use of the entire inner cross-sectional area of the curing furnace, and this make the process a very efficient manufacturing method permitting manufacture of far more products in number capable of being manufactured at a time within a limited volume as compared with the die process.

When forming a round strand in the die process, a round groove hole is formed in the die, and a product is available by heating and curing resin in this hole. In the process of this embodiment, the object is achieved by imparting an appropriate tensile force to the resin-impregnated reinforcing fibers f2 subjected to degree of twisting higher than a certain level. This eliminates the necessity for a die and permits improvement of the manufacturing efficiency and the following quality improvement measures.

In the aspect of quality, the method of this embodiment does not use a release agent, unlike the die process described later, thus providing a better adhesion between the completed fiber-reinforced plastic strand and the adhesive, without the need for a processing such as surface roughing of the fiber-reinforced plastic strand, free from the risk of flawing the product. It is thus more excellent in quality as well as in cost.

The fiber-reinforced plastic strand 2 of which the resin has been cured in the heating-curing furnace 27 is guided through the guide holes 29 (29a and 29b) formed in the guide 28, and wound by the winding bobbins 30 (30a and 30b) of the winding device 54.

The reinforced fiber bundles after the completion of resin curing, i.e., the fiber-reinforced plastic strands 2, wound by the winding bobbins 30 are hard strands at this stage, and therefore cannot be wound on a small-diameter bobbin. They are therefore wound by attaching large-diameter reels around the winding shafts, i.e., the rotating shafts 31 (31a and 31b).

In this embodiment, the fiber-reinforced plastic strand 2 has a diameter of 0.5 to 3.0 mm.

After removing the reel 30 from the rotating shaft 31, the fiber-reinforced plastic strand 2 thus prepared is fed to the blind-shaped fiber-reinforced sheet manufacturing step, which is the next step. The manufacturing method of the blind-shaped fiber-reinforced sheet will be described later.

(Comparison to the Pultrusion Process)

Then, the pultrusion process for manufacturing general fiber-reinforced plastic strands will be described below to clearly show differences from the manufacturing method of this embodiment.

Figure 6:
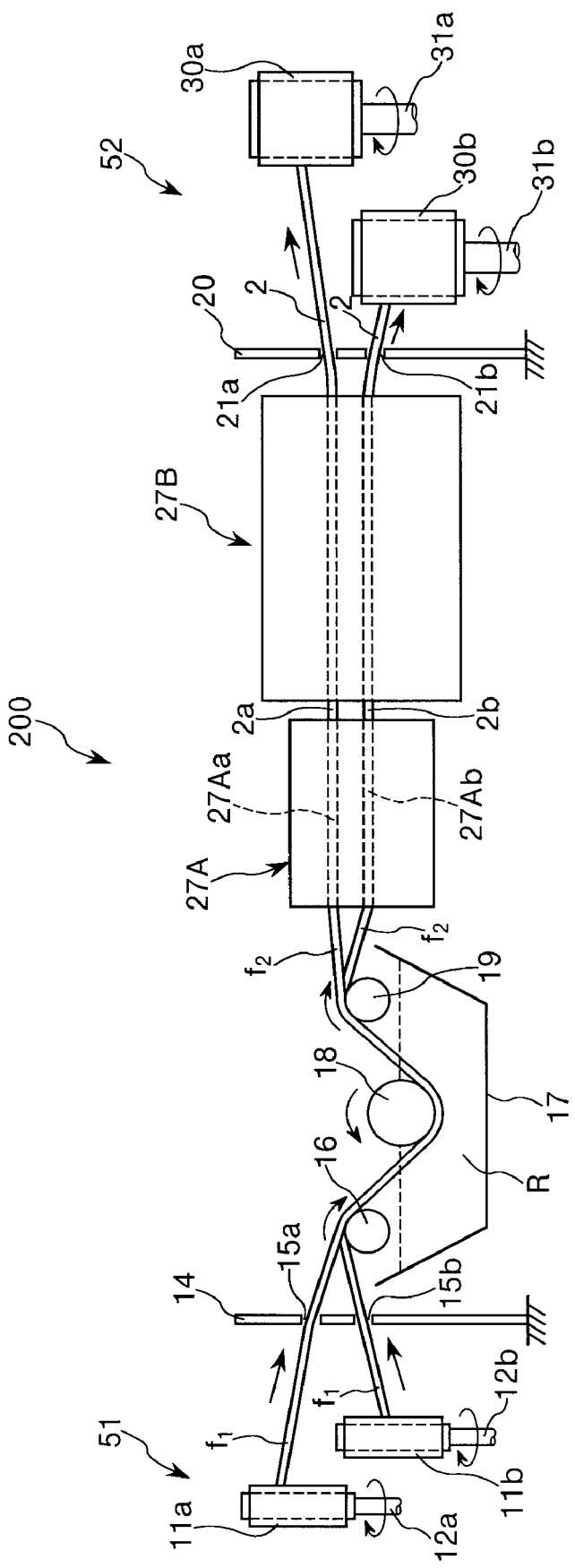
FIG. 6 is a schematic configuration view of the strand manufacturing equipment for describing the conventional pultrusion process.

The manufacturing method of fiber-reinforced plastic strands based on the conventional pultrusion process will be described with reference to FIG. 6. FIG. 6 shows a step in which the reinforcing fibers f move from left to right, and during this movement, the resin impregnation, the round forming, the primary heating-curing, the secondary heating-curing and the winding steps are carried out. The details will be described below.

The same component parts as in the manufacturing equipment 100 of this embodiment described above are assigned the same reference numerals as above, and detailed description thereof will be omitted here.

According to the manufacturing equipment 200 for executing the pultrusion process shown in FIG. 6, the reinforcing fiber bundles f1 each comprising a plurality of reinforcing fibers f not as yet impregnated with the resin and wound on the delivery bobbins 11 (11a and 11b) are delivered by rotating the rotating shafts 12 (12a and 12b) and fed to the resin impregnating step. The pultrusion process contains no step of twisting the reinforcing fiber bundles f1 which forms a feature of the present invention.

The reinforcing fiber bundles f1 delivered from the bobbins 11 are guided through the guide holes 15 (15a and 15b) of the guide 14, and fed to the resin impregnating step, the next step.

The reinforcing fiber bundles f1 fed to the resin impregnating step are introduced by the entry guide roller 16 to the impregnating roller 18 and the resin is impregnated. The entry guide roller 16 plays a role of arranging the plurality of fibers composing the reinforcing fiber bundles f1 prior to resin impregnation of the reinforcing fiber bundles f1 composing the plurality of reinforcing fibers f in order.

The impregnating roller 18 has a function of forcedly dipping the reinforcing fiber bundles f1 into the resin R, and is used in a state in which at least the lower half of the roller is immersed in the resin R collected in the resin impregnating tank 17.

The exit guide roller 19 installed at the exit of the resin impregnating tank 17 has a role of arranging the resin-impregnated reinforcing fiber bundles f2 in order before sending to the primary heating-curing step, the next step.

In contrast, the exit roller pair 19 (19a and 19b) of the aforementioned embodiment of the present invention has a role of controlling the amount of resin. The exit guide roller 19 in the equipment 100 is largely different in function from the exit roller pair 19 (19a and 19b) in the present invention.

The resin-impregnated reinforcing fiber bundles f2 are fed to the heating die 27A and then sent to the heating-curing furnace 27B.

More specifically, the heating die 27A has a function of round forming by use of the die and primary curing of resin. The die 27A has round grooves 27Aa and 27Ab having a prescribed diameter carved in the moving direction of the reinforcing fiber bundles f2. Upon passing through these round grooves 27Aa and 27Ab, the resin-impregnated reinforcing fiber bundles f2 are heated by heating wires incorporated in the die, thus accomplishing primary curing of the resin, thus giving semi-cured round-shaped fiber-reinforced plastic strands 2a and 2b.

The resin content in the fiber-reinforced plastic strand is controlled by squeezing excessive resin at the entry of the die 27A. It is therefore a defect of this process that the resin content cannot be changed unless the amount of the reinforcing fiber bundles f2 fed to into the die grooves 27Aa and 27Ab is changed.

Since the resin-impregnated reinforcing fiber bundles f2 move through the die 27A, it is not absolutely allowed that the resin adheres to the die. To avoid adherence of the resin to the die, therefore, the resin contains a large quantity of release agent.

When prepared strands 2 are actually applied as a blind-shaped fiber-reinforced sheet, this release agent hinders adherence of the resin. In a measure to solve the problem, this is coped with by applying surface roughing with sand paper or the like to the strand surface. This surface roughing is almost equivalent to flawing, causing a decrease in physical properties such as strength.

The manufacturing speed also is limited by this die 27A, so that the round shape must be ensured within this die 27A. It is therefore impossible to accomplish forming into a prescribed shape at a speed higher than a certain level (varying with the kind of resin used; 0.8 m/minute for epoxy resin). This limitation is non-existent for the manufacturing method described in the aforementioned embodiment of this invention.

The secondary heating furnace 27B takes charge of the step of secondary heating-curing. This step fills up the insufficiency of the primary curing of the round-shaped fiber-reinforced plastic strand 2a semi-cured in the die 27A, and ensures complete curing of the impregnated resin.

The strands 2 completely cured in the secondary heating furnace 27B are fed through the guide holes 21 (21a and 21b) of the guide 20 to the bobbins 30 (30a and 30b) of the winding device, and wound on the bobbins 30.

A large difference between the manufacturing method of this embodiment and the conventional pultrusion process is whether or not the delivery, the resin impregnation, the heating-curing, and the winding steps are continuous. That is, while they are continuous in the conventional pultrusion process, they are not continuous in the manufacturing method of the above-mentioned embodiment.

Even in the manufacturing method of the above embodiment, these processes may be continuous if a tension controller or the like is inserted between the resin impregnating and the heating-curing steps so as to permit tension control during the period of heating-curing. Therefore, the manufacturing method of the above embodiment cannot be considered inferior in terms of process continuation.

(Fiber-Reinforced Plastic Strand)

The fiber-reinforced plastic strand 2 manufactured by this manufacturing method will now be described with reference to FIG. 4.

FIG. 4 illustrates a cross-section of the fiber-reinforced plastic strand 2 manufactured by the manufacturing method of this embodiment. The fiber-reinforced plastic strand 2 has a circular cross-sectional shape, i.e., round-shaped, in which a plurality of reinforcing fibers f are impregnated with a matrix resin R.

The fiber-reinforced plastic strand 2 manufactured by the manufacturing method of this embodiment has twists within a range from 5 to 40 twists per m. With a number of twists under 5 per m, it is difficult to ensure a stable circular (round) shape even when a tension is applied during curing of the resin. A number of twists over 40 per m impairs linearity of the reinforcing fiber f, leading to a serious decrease in physical properties such as strength of the fiber-reinforced plastic strand 2. A number of twists over 40 per m is not therefore desirable. Particularly, a range from 10 to 20 twists per m is optimum.

The range of available ratios of the matrix resin R relative to the reinforcing fibers f composing this fiber-reinforced plastic strand 2 is, in volumetric ratio of the matrix resin, from 30 to 60%. A ratio under 30% leads to shortage of resin, resulting in a decrease in physical properties such as strength of the fiber-reinforced plastic strand 2 after manufacture. A ratio over 60% leads, on the other hand, to an excess, making it difficult during resin curing to ensure a round shape as a result of run of resin. A particularly optimum volumetric range of matrix resin is from 40 to 50%.

Furthermore, a tensile force (tension), to be applied upon curing the matrix resin of 500 to 3,000 g/piece is appropriate. With a tensile force under 500 g/piece, it is difficult to ensure a round shape, whereas a force over 3,000 g/piece causes a trouble of breakage of the reinforcing fibers on the way of manufacture, resulting in a problem of impossibility to maintain stable manufacture. The optimum range of tensile force is therefore from 1,000 to 2,000 g/piece.

The optimum range for the strand diameter (d) of the fiber-reinforced plastic strand 2 manufactured by the manufacturing method of this embodiment is from 0.5 to 3.0 mm. A strand diameter under 0.5 mm causes frequent occurrence of breaking (rupture) of the reinforcing fibers f during manufacture. A strand diameter over 3.0 mm, on the other hand, causes breakage (buckling) of the fibers f upon winding the resin-impregnated reinforcing fibers f2, resulting in a serious decrease in physical properties such as strength of the fiber-reinforced plastic strand 2 after curing. The suitable range of the strand diameter (d) of the fiber-reinforced plastic strand 2 is from 0.8 to 1.5 mm, particularly.

On the other hand, fibers such as glass fiber, carbon fiber, aramid fiber, FBO fiber and polyester fiber are applicable in the manufacturing method of this embodiment, and among others, carbon fiber is particularly suitably applicable. Other fibers are also applicable for special uses in such markets requiring electrical insulation and markets dealing with products tending to suffer from electric corrosion with metals.

In the manufacturing method of this embodiment, resins such as epoxy resin, vinylester resin, MMA resin, unsaturated polyester resin and phenol resin are applicable. Among others, epoxy resin is particularly suitably applicable. Other resins are also usable for special uses such as the one requiring use at high temperatures or requiring a high special corrosion resistance.

EXPERIMENTAL EXAMPLES

The manufacturing method of fiber-reinforced plastic strands 2 of this embodiment will be described further in detail with reference to some examples of experiment.

Experimental Example 1

In this example, fiber-reinforced plastic strands 2 were manufactured in the following manners as basic products by use of the equipment shown in FIGS. 1 to 3.

PAN-based carbon fiber strand (carbon fiber bundle f1) ("TR50" (commercial name) made by Mitsubishi Rayon Co., Ltd.) having an average diameter of 7 μm and a number of fibers in bundle of 15,000 fibers was used as a reinforcing fiber f, and an epoxy resin ("EPOMIC R140P" (commercial name) made by Mitsui Chemicals Inc.) having a curing temperature of 120° C. was used as a matrix resin R.

In this experimental example, the number of twists was 10/m, and a resin-impregnated strand (carbon fiber bundle f2) with uncured resin having an amount of resin impregnation of 55% as represented by a resin volumetric ratio was manufactured.

Subsequently, a tensile force of 2,000 g/piece was entered into the resin-impregnated strand f2, and curing was accomplished at a curing temperature of 120° C. for the curing furnace 27, and during a curing time of 30 minutes.

The thus obtained fiber-reinforced plastic strand 2 had a circular cross-section having a diameter (d) of 1.0 mm.

Strand manufactured under the same manufacturing conditions as those for the above-mentioned basic product except for 3 twists/m, 5 twists/m, 40 twists/m and 45 twists/m were prepared as comparative materials.

The fiber-reinforced plastic strands were mutually compared as to the cross-sectional shape, and compared through tensile tests of the products. The result is shown in Table 1.

TABLE 1

| Test material | Sectional shape | Breaking load (N) |
| --- | --- | --- |
| 10 twists/m (Basic product) | Diameter: 1.1 mm | 2490 |
| 3 twists/m | Elliptic | 2498 |

TABLE 1-continued

| Test material | Sectional shape | Breaking load (N) |
| --- | --- | --- |
| 5 twists/m | D: 1.1 mm, Almost circular | 2493 |
| 40 twists/m | D: 1.1 mm, circular | 2312 |
| 45 twists/m | D: 1.1 mm, circular | 2253 |

As is evident from the above table, with a number of twists of under 5 twists/m, it is difficult to maintain a circular shape. A number of twists of over 40 may lead to a sudden decrease in product strength, causing another problem.

Products were manufactured under the same manufacturing conditions as those for the aforementioned basic product except that the number of twists was fixed to 10 twists/m and the amount of resin impregnation was varied to 45%, 30%, 25%, 60% and 65% in the resin volumetric ratio.

These fiber-reinforced plastic strands were mutually compared in terms of the sectional shape, and comparison was performed also for the results of tensile tests carried out for the products. The result is shown in Table 2.

TABLE 2

| Test material | Sectional shape | Breaking load (N) |
| --- | --- | --- |
| Amount of resin Impregnation: 45% | Diameter: 1.1 mm, circular | 2490 |
| Amount of resin Impregnation: 30% | D: 1.0 mm, circular | 2482 |
| Amount of resin Impregnation: 25% | D: 0.98 mm; Circular; dry surf. | 2232 |
| Amount of resin Impregnation: 60% | D: 1.3 mm; almost circular | 2385 |
| Amount of resin Impregnation: 65% | Much resin run; circular shape not achieved | — |

As is clear from the table above, with an amount of resin impregnation under 30%, the resultant shortage of resin causes a dry surface, leading to a decrease in strength. With an amount of resin impregnation over 60%, an increase in the resin content leads to a larger diameter of the strand, causes occurrence of run of resin, and makes it difficult to ensure a target shape.

Then, while fixing the number of twists to 10 twists/m, and the amount of resin impregnation at 55%, the tensile force upon resin curing was varied to 2,000 g/piece, 400 g/piece, 500 g/piece, 300 g/piece, and 3,500 g/piece, and products were manufactured with the same other manufacturing conditions as those for the above-mentioned basic product of this experimental example.

These fiber-reinforced plastic strands were mutually compared in terms of the cross-sectional shape, and comparison was made also through a tensile test of the products. The result is shown in Table 3.

TABLE 3

| Test material | Sectional shape | Breaking load (N) |
| --- | --- | --- |
| Tensile force: 2,000 g/piece | Diameter: 1.1 mm, circular | 2490 |
| Tensile force: 400 g/piece | Flat shape | 2193 |
| Tensile force: 500 g/piece | D: 1.1 mm, Almost circular | 2315 |

TABLE 3-continued

| Test material | Sectional shape | Breaking load (N) |
| --- | --- | --- |
| Tensile force: 3,000 g/piece | D: 1.1 mm, circular | 2286 |
| Tensile force: 3,500 g/piece | Broken upon manufacture | 2032 |

As is understood from the table above, a tensile force under 500 g/piece makes it difficult to ensure a circular shape, and at the same time, leads to a lower strength of the product. A tensile force over 3,000 g/piece causes occurrence of breakage of carbon fibers upon manufacture, makes it difficult to accomplish manufacture, and results in a serious decrease in strength of the product.

On the other hand, as a comparative example, a fiber-reinforced plastic strand was manufactured by the pultrusion process shown in FIG. 6 from the same PAN-based fiber strands having an average diameter of 7 μm and a number of fibers in bundle of 15,000 fibers as in the above example, as reinforcing fibers, and by use of epoxy resin curing at 120° C. as a matrix resin.

In this manufacture, the amount of resin impregnation was 55% in the volumetric ratio of resin, and the resultant strand had a diameter of 1.0 mm.

The result of a tensile test carried out on the strands of the comparative example showed almost the same breaking load of 2,458 N as that of the fiber-reinforced plastic strand as the above-mentioned basic product of this example.

This proved that the product manufactured by the manufacturing method of this example was by no means inferior to the product manufactured by the conventional manufacturing method.

Embodiment 2

Other manufacturing methods and other manufacturing equipments of the fiber-reinforced plastic strand of the present invention will now be described with reference to FIGS. 7 and 8.

The manufacturing equipment of this embodiment has the same configuration as that of the manufacturing equipment 100 of embodiment 1, having a fiber-feeding/resin-impregnating/winding section 100A, and a fiber-tensioning/heating-curing section 100B.

Figure 7:
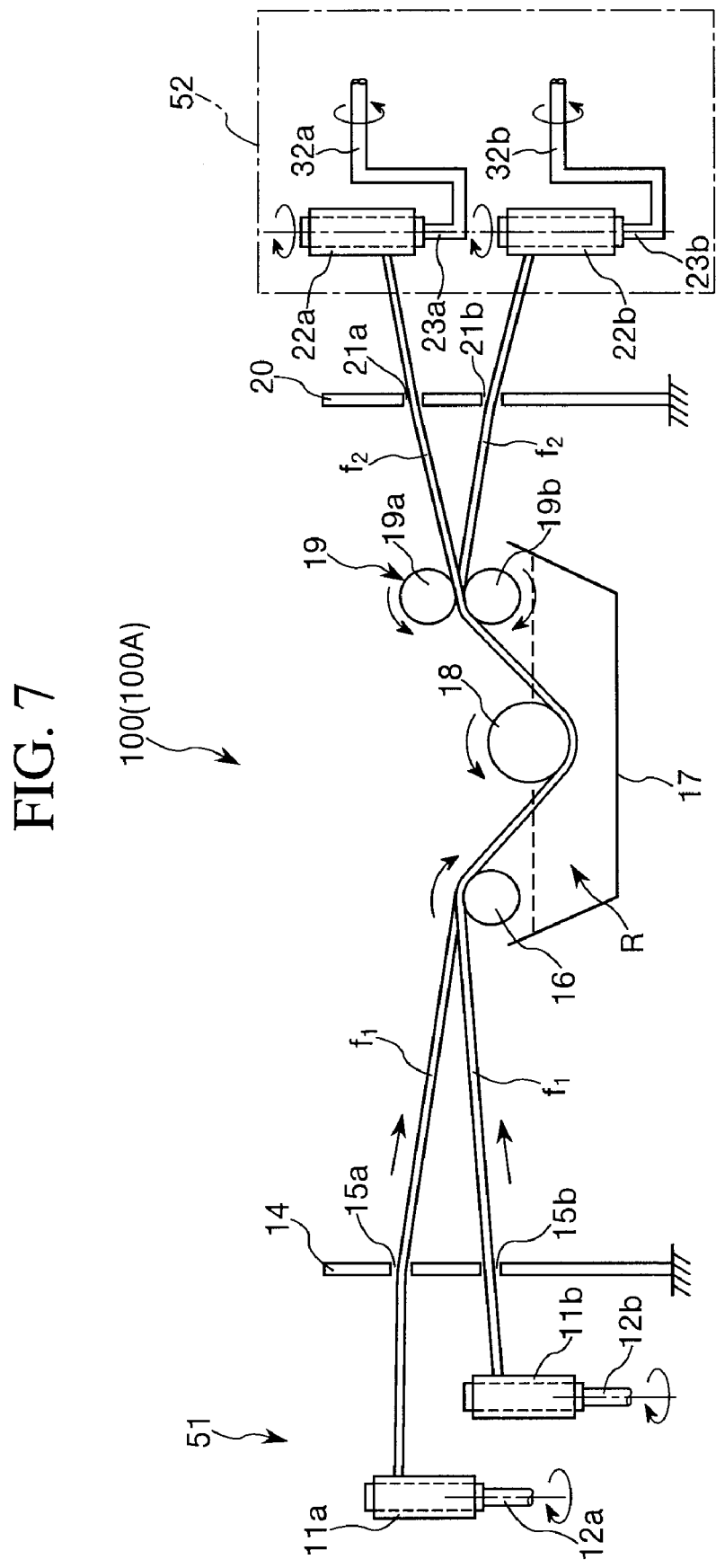
FIG. 7 is a schematic configuration view of the manufacturing equipment for describing another embodiment of the manufacturing method of the fiber-reinforced plastic strand of the present invention.
Figure 8:
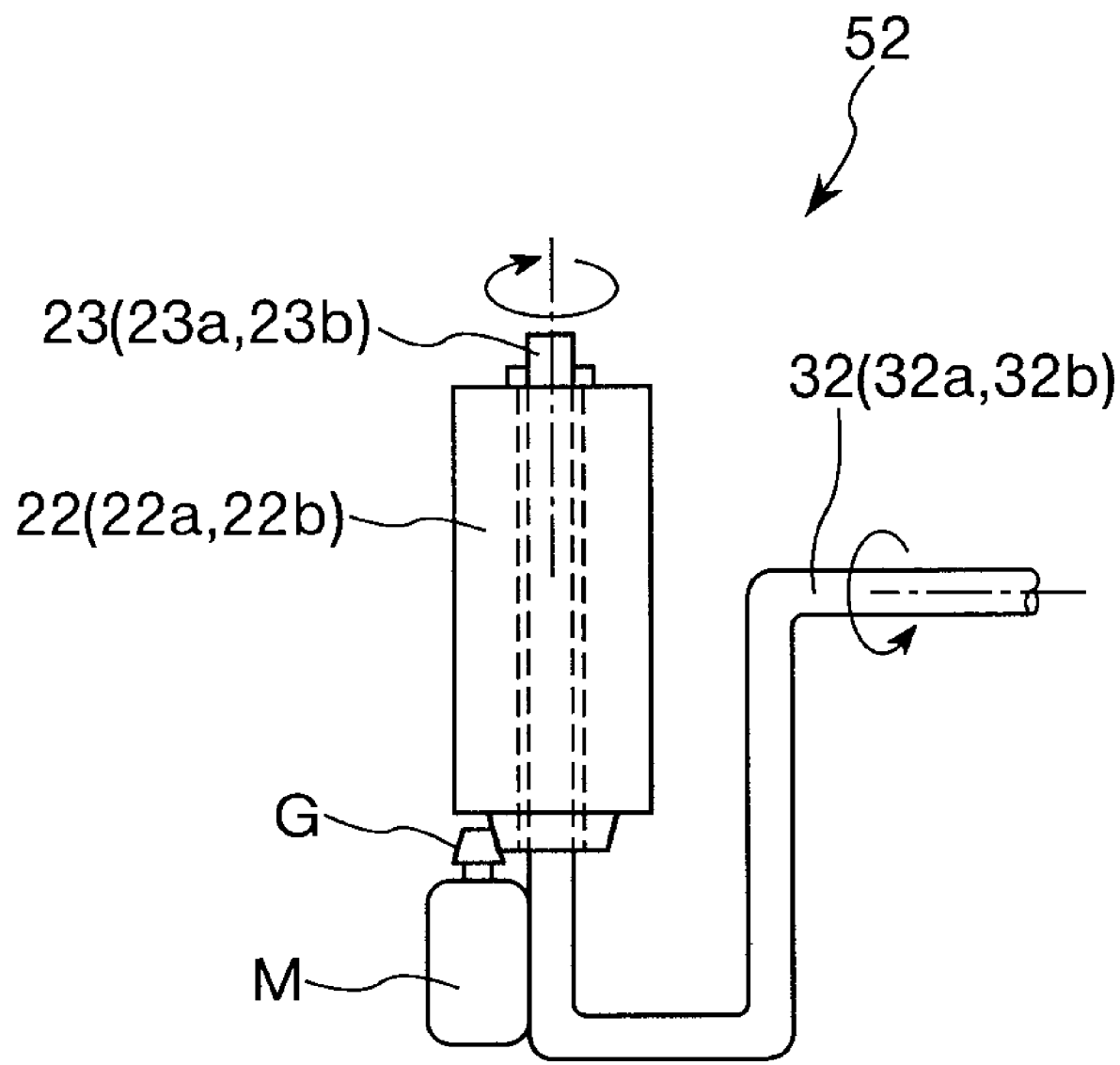
FIG. 8 is a schematic configuration view for describing operation of the winding bobbin in the manufacturing equipment for describing another embodiment of the manufacturing method of the fiber-reinforced plastic strand of the present invention.

In this embodiment, as shown in FIGS. 7 and 8, the fiber-feeding/resin-impregnating/winding section 100A is different from the manufacturing equipment 100 of embodiment 1 only in that the twisting processing of the fibers is carried out after the completion of resin impregnation. Therefore, the same reference numerals are assigned to the component parts having the same configuration and functions as in embodiment 1, and a detailed description thereof is omitted here.

The fiber-tensioning/heating-curing section 100B of the manufacturing equipment 100 in this embodiment is similar to that of the manufacturing equipment 100 of embodiment 1. The description for embodiment 1 will therefore be utilized here, omitting the description in this embodiment.

FIG. 7 illustrates the fiber-feeding/resin-impregnating/winding section 100A of the manufacturing equipment 100 in this embodiment. In FIG. 7, reinforcing fiber strands (reinforcing fiber bundles) f1 each comprising a plurality of reinforcing fibers f move from left to right, and during this movement, resin impregnation and twisting are applied.

That is, referring to FIG. 7, in the fiber-feeding/resin-impregnating/winding section 100A of this embodiment, a plurality of, two in this embodiment, delivery bobbins (cylindrical reels) 11 (11a and 11b) for feeding device 51, and reinforcing fiber strands (reinforcing fiber bundles) f1 each containing a prescribed number of reinforcing fibers f not as yet impregnated with resin are wound on each bobbin.

The reinforcing fiber bundles f wound around each bobbin 11 are guided through guide holes 15a and 15b and continuously fed to the resin impregnating step (reinforcing fiber bundle feeding step).

The reinforcing fiber bundles f1 fed to the resin impregnating step are impregnated with the resin in the resin impregnating tank 17. The configuration and the details of operation at the resin impregnating step are the same as in embodiment 1.

The resin-impregnated reinforcing fiber bundles f2 are wound around the winding bobbins 22 (22a and 22b) in the winding device 52.

At this point in time, as is well understood by referring to FIG. 8, the winding bobbins 22 (22a and 22b) are attached to the rotating shafts 23 (23a and 23b) provided in the winding device 52, these rotating shafts 23 being rotatably attached to the main rotating shafts 32 (32a and 32b) of the winding device.

Each bobbin 22 winds thereon the resin-impregnated reinforcing fiber bundles f2 by rotating around the rotating shafts 23 of the bobbins 22 under the effect of the driving motor M and the gear transmitting mechanism G. Simultaneously, the bobbins 22 (22a and 22b) are rotated around the main rotating shafts 32 (32a and 32b) together with the rotating shafts 23 (23a and 23b) while rotating around the rotating shafts 23 (23a and 23b), respectively, as described above.

That is, the bobbins 22 rotate around the rotating shafts 23, and at the same time, rotate also around the main rotating shafts 32, thus winding the reinforcing fiber bundles f2.

Therefore, the reinforcing fiber bundles f2 guided from the resin impregnation tank 17 through the exit roller pair 19 (19a and 19b) and the guide holes 21 (21a and 21b) formed in the guide 20, and wound onto the bobbins 22 are subjected to twisting processing.

The number of twists per m can be controlled by adjusting the number of revolutions of the bobbins 22 around the main rotating shafts 32 and the winding speed of the reinforcing fiber bundles f2.

According to this embodiment, as in embodiment 1, the fiber-reinforced plastic strand should preferably have a diameter from 0.5 to 3.0 mm. The reinforcing fiber bundles f1 fed to the impregnating step would use, when carbon fiber is used as a reinforcing fiber, a carbon fiber strand (carbon fiber bundle) f1 forced by collecting 3,000 to 48,000 carbon fibers (filaments) each having a diameter of 6 to 10 μm.

The number of twists of the reinforcing fiber bundle f1 should preferably be 5 to 40 twists/m.

The bobbins 22 around which the resin-impregnated reinforcing fiber bundles f2 have been wound are detached and the bundles are fed to the next heating and curing step.

In this embodiment, the fiber-twisting/heating-curing section 100B having the same configuration as in embodiment 1 is used.

More specifically, with reference to FIG. 2, the bobbins 22 (22a and 22b) around which the resin-impregnated reinforcing fiber bundles f2 have been wound in the above-mentioned resin impregnating step are installed on the rotating shafts 24 (24a and 24b) of the delivery device 53. That is, the winding bobbins 22 have a function as delivery bobbins in the tensioning/heating-curing step.

The resin-impregnated uncured reinforcing fiber bundles f2 wound on the delivery bobbins 22 are delivered by causing rotation of the bobbins 22 around the rotating shafts 24 (24a and 24b). The reinforcing fiber bundles f2 are passed through the heating-curing furnace 27, and wound around the winding bobbins 30 (30a and 30b).

In this embodiment as well, as in embodiment 1, the resin-impregnated and twisted reinforcing fiber bundles f2 are delivered from the bobbins 22, introduced into the heating-curing furnace 27, and heated and cured. The heated and cured reinforcing fiber bundles, i.e., the reinforcing fiber plastic strands 2 are wound around the winding bobbins 30. At this point in time, a prescribed tensile force is applied to the resin-impregnated reinforcing fiber bundles f2, and heating and curing are performed in this tensioned state (reinforcing fiber bundle tensioning/heating-curing step).

Comparison of the manufacturing method of embodiment 1 and the manufacturing method of this embodiment reveals the following differences between the two manufacturing methods. According to the manufacturing method of embodiment 1, the manufacturing steps can be integrated into a continuous process by connecting the fiber-feeding/resin-impregnating/winding section 100A and the fiber-tensioning/heating-curing section 100B.

According to the manufacturing method of this embodiment, in contrast, it is difficult to achieve a continuous manufacturing process.

On the other hand, in the manufacturing method of embodiment 1, a problem is encountered in that, when a fiber-reinforced plastic strand having a large diameter over 2.0 mm, is to be impregnated with the resin after twisting the strand, it is difficult to impregnate the reinforcing fiber bundle f1 up to the interior thereof.

It is therefore reasonable to determine which of these manufacturing methods is to be selected, depending upon the type of product to be manufactured.

EXPERIMENTAL EXAMPLES

The manufacturing method of the fiber-reinforced plastic strand 2 of this embodiment will now be described further concretely with reference to some examples of experiment.

Experimental Example 2

In this experimental example, fiber-reinforced plastic strands 2 were manufactured by use of the equipments shown in FIGS. 7, 8 and 2.

As in the case of experimental example 1 described in embodiment 1, the reinforcing fiber f was manufactured by use of PAN-based carbon fiber strand (carbon fiber bundle f1) ("TR50" (commercial name) made by Mitsubishi Rayon Co., Ltd.) comprising collection of 15,000 fibers with an average diameter of 7 μm, and by using, as a matrix resin R, an epoxy resin cured at 120° C. ("EPOMIC R140P (commercial name) made by Mitsui Chemicals Inc.).

Fiber-reinforced plastic strands 2 were manufactured under conditions including a number of twists of 10 twists/m, an amount of resin impregnation of 45% in volumetric ratio of resin, a tensile force of 2,000 g/piece upon resin curing, a resin curing temperature of 120° C. in a curing furnace, and a curing time of 30 minutes.

As a result, the thus manufactured product showed almost the same product sectional shape as that of the fiber-reinforced plastic strand manufactured by the manufacturing method forming the basis of experimental example 1 of embodiment 1, and a product breaking load almost the same as that of experimental example 1 as shown in Table 4.

This reveals that there is no difference between the products manufactured in experimental examples 1 and 2 as methods for manufacturing fiber-reinforced plastic strands 2.

TABLE 4

| Test material | Sectional shape | Breaking load (N) |
| --- | --- | --- |
| Example 1 | Diameter: 1.0 mm, Circular | 2490 |
| Example 2 | Diameter: 1.1 mm, Circular | 2494 |

Embodiment 3

An embodiment of the fiber-reinforced sheet using the fiber-reinforced plastic strand 2 manufactured in the aforementioned embodiments 1 and 2 will now be described with reference to FIG. 5.

Figure 5:
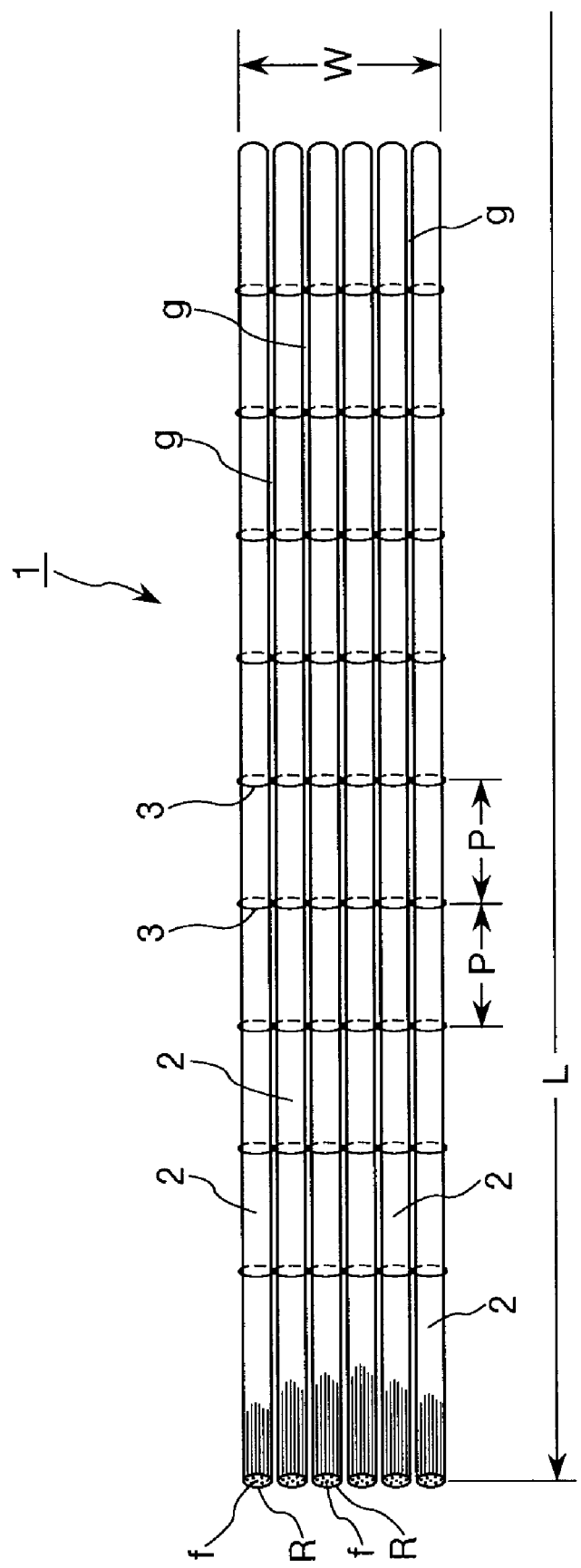
FIG. 5 is a perspective view illustrating an embodiment of the fiber-reinforced sheet of the present invention.

FIG. 5 illustrates an embodiment of the fiber-reinforced sheet 1 of the present invention. The fiber-reinforced sheet 1 is manufactured by arranging a plurality of continuous fiber-reinforced plastic strands 2 manufactured in the above-mentioned embodiments 1 and 2 in a blind shape in the longitudinal direction, and fixing the strands 2 by means of a fixing fiber material 3.

The fiber-reinforced plastic strands 2 are manufactured by impregnating a plurality of continuous reinforcing fibers f arranged in a direction with a matrix resin R, cured and formed into a long and slender shape with elasticity. The fiber-reinforced sheet 1 obtained by arranging the fiber-reinforced plastic strands having such a modulus of elasticity in a blind shape, i.e., closely spaced apart from each other into a sheet shape are elastic in the longitudinal direction thereof. As a result, the fiber-reinforced sheet 1 is portable in a state rolled in into a prescribed radius upon transportation. They are very rich in portability. Since the fiber-reinforced sheet 1 is composed of fiber-reinforced plastic strands 2, there is no risk of a disturbed orientation of reinforcing fibers, as in conventional non-impregnated reinforcing fiber sheet, during transportation, or of occurrence of thread breakage caused by a disturbed orientation of reinforcing fibers upon introducing a tensile force.

As described above, the small-diameter fiber-reinforced plastic strand 2 used in this embodiment has a diameter from 0.5 to 3.0 mm, forming a circular sectional shape (FIG. 4).

In the fiber-reinforced sheet 1 arranged in a direction into a blind shape as described above, the strands 2 are fixed with the fixing fiber material 3, closely spaced apart by a gap (g) from 0.1 to 1.0 mm from each other. The length (L) and the width (W) of the fiber-reinforced sheet 1 thus formed are appropriately selected in response to the size and the shape of the structure to be reinforced. From handling considerations, however, the total width (W) is usually from 100 to 500 mm. Regarding the length (L), a length over 100 m is manufacturable. This is actually used by appropriately cutting.

An applicable method for fixing each strand with the fixing fiber material 3 comprises using wefts as the fixing fiber material for example, as shown in FIG. 5, charging strands in a sheet shape composed of a plurality of strands arranged in a direction into a blind shape, i.e., a continuous strand sheet at certain intervals (P) perpendicular to the strands, and knitting them. There is no particular limit on the charging intervals (P) between wefts which are however selected within a range of intervals usually from 1 to 15 mm, considering manageability of the manufactured fiber-reinforced sheet 1.

In this case, the weft 3 should be in a thread shape comprising a bundle of a plurality of glass fibers or organic fibers having a diameter, for example, of 2 to 50 µm. As an organic fiber, nylon, vinylon or the like is suitably applicable.

An experimental example of the fiber-reinforced sheet of the present invention will now be described.

Experimental Example 3

A concrete beam was reinforced in accordance with the strained bonding process by use of the fiber-reinforced sheet of the present invention.

In this experimental example, the fiber-reinforced sheet 1 having the configuration described with reference to FIG. 5 was used.

The fiber-reinforced plastic strand 2 prepared in experimental examples 1 and 2 was used as the fiber-reinforced plastic strand 2 in the fiber-reinforced sheet 1. The strand 2 had a circular section having a diameter of 1.4 mm.

The thus obtained fiber-reinforced plastic strands were arranged in order in a direction in a blind shape, closely spaced apart from each other by a gap (g) of 0.1 to 10 mm, and fixed with the fixing fiber material 3.

The thus prepared fiber-reinforced sheet 1 had a width (W) of 200 mm and a length (L) of 100 m. The gap between neighboring strands 2 was from 0.3 to 0.4 mm.

The concrete beam was reinforced as follows by the strained bonding process by use of the above-mentioned fiber-reinforced sheet 1.

To begin with in this experimental example, prior to bonding the fiber-reinforced sheet 1 to the concrete beam, a tensile force of 10,000 kg/mm$^2$ was introduced into the fiber-reinforced sheet 1. No thread breakage occurs upon introducing the tensile force, thus permitting introduction of a sufficient tensile force to a point close to the breaking strength of carbon fiber.

In a state in which the fiber-reinforced sheet 1 was kept in tension, a matrix resin was coated onto the fiber-reinforced sheet 1 from the side facing the concrete beam sheet bonding surface, and then, the fiber-reinforced sheet 1 was bonded to the concrete beam bonding surface. To increase the bonding strength at this point in time, the entire periphery of the fiber-reinforced sheet was covered with a bug film. Air contained in the bug film was let out by a vacuum pump, and bonding was accomplished while pressing it against the beam under a vacuum pressure. No void was produced on the bonding surface of the fiber-reinforced sheet 1, thus making it possible to satisfactorily bond it to the concrete beam.

Reinforcement of a concrete structure has been described in experimental example 3 above. The fiber-reinforced sheet 1 of the present invention is similarly applicable for reinforcement of a steel structure with similar effect of application.

The fiber-reinforced sheet 1 of the present invention is also suitably applicable to a reinforcing process for reinforcement simply by bonding to a structure other than the strained bonding process described in the above-mentioned experimental example.

What is claimed is:

1. A manufacturing method of a continuous circular-shaped fiber-reinforced plastic strand, for manufacturing a fiber-reinforced plastic strand having a circular-shaped cross-section and a diameter from 0.5 to 3.0 mm, said method comprising:
   (a) a step of continuously feeding reinforcing fiber bundles each comprising a plurality of reinforcing fibers arranged in a direction while twisting, a number of twists of said reinforcing fiber bundles being from 5 to 40 twists/m;
   (b) a step of impregnating said continuously fed reinforcing fiber bundles with a matrix resin, the volume ratio of the amount of impregnation of said matrix resin to the amount of said reinforcing fibers being from 30 to 60%; and
   (c) a step of heating said resin-impregnated reinforcing fiber bundles while straining the bundles at an intensity of from 500 g/piece to 3,000 g/piece and hardening the resin into a circular-shaped cross-section of the reinforcing fiber bundles.

2. The manufacturing method of a circular-shaped fiber-reinforced plastic strand according to claim 1, wherein said reinforcing fiber is any of glass fiber, carbon fiber, aramid fiber, PBO (polyphenylenebenzbisoxazole) fiber, and polyester fiber.

3. The manufacturing method of a circular-shaped fiber-reinforced plastic strand according to claim 1, wherein said matrix resin is any of epoxy resin, vinylester resin, MMA resin, unsaturated polyester resin, and phenol resin.

4. A circular-shaped fiber-reinforced plastic strand which comprises a plurality of reinforcing fibers arranged in a direction, in which reinforcing fiber bundles subjected to a twisting processing are impregnated with a resin, having a circular-shaped cross-section, wherein:
   said fiber-reinforced plastic strand is a fiber-reinforced plastic strand manufactured by the manufacturing method recited in claim 1.

5. A fiber-reinforced sheet which is a sheet-shaped reinforcing material for reinforcing a structure by bonding thereto, in which reinforcing fibers are impregnated with a matrix resin, a plurality of hardened and continuous fiber-reinforced plastic strands are arranged into a blind shape in the longitudinal direction, and said strands are fixed to each other with a fixing fiber material, wherein:
   said fiber-reinforced plastic strand is a fiber-reinforced plastic strand manufactured by the manufacturing method recited in claim 1.

6. The fiber-reinforced sheet according to claim 5, wherein said individual fiber-reinforced plastic strands are spaced apart from each other by 0.1 to 1.0 mm.

7. The fiber-reinforced sheet according to claim 5, wherein said fixing fiber material is in a thread shape comprising glass fiber or organic fiber.

8. A manufacturing method of a circular-shaped fiber-reinforced plastic strand, for manufacturing a fiber-reinforced plastic strand having a circular-shaped cross-section and a diameter from 0.5 to 3.0 mm, said method comprising:
   (a) a step of continuously feeding reinforcing fiber bundles each comprising a plurality of reinforcing fibers arranged in a direction;
   (b) a step of impregnating said continuously fed reinforcing fiber bundles with a matrix resin, the volume ratio of the amount of impregnation of said matrix resin to the amount of said reinforcing fibers being from 30 to 60%;
   (c) a step of twisting said resin-impregnated reinforcing fiber bundles, a number of twists of said reinforcing fiber bundles being from 5 to 40 twists/m; and
   (d) a step of heating said resin-impregnated and twisted fiber bundles while straining the bundles at an intensity of from 500 g/piece to 3,000 g/piece and hardening the resin into a circular-shaped cross-section of the reinforcing fiber bundles.

9. The manufacturing method of a circular-shaped fiber-reinforced plastic strand according to claim 8, wherein said reinforcing fiber is any of glass fiber, carbon fiber, aramid fiber, PBO (polyphenylenebenzbisoxazole) fiber, and polyester fiber.

10. The manufacturing method of a circular-shaped fiber-reinforced plastic strand according to claim 8, wherein said matrix resin is any of epoxy resin, vinylester resin, MMA resin, unsaturated polyester resin, and phenol resin.

11. A fiber-reinforced sheet which is a sheet-shaped reinforcing material for reinforcing a structure by bonding thereto, in which reinforcing fibers are impregnated with a matrix resin, a plurality of hardened and continuous fiber-reinforced plastic strands are arranged into a blind shape in the longitudinal direction, and said strands are fixed to each other with a fixing fiber material, wherein:

said fiber-reinforced plastic strand is a fiber-reinforced plastic strand manufactured by the manufacturing method recited in claim 8.

12. A fiber-reinforced sheet which is a sheet-shaped reinforcing material for reinforcing a structure by bonding thereto, in which reinforcing fibers are impregnated with a matrix resin, a plurality of hardened and continuous fiber-reinforced plastic strands are arranged into a blind shape in the longitudinal direction, and said strands are fixed to each other with a fixing fiber material, wherein:

said fiber-reinforced plastic strand is a fiber-reinforced plastic strand manufactured by the manufacturing method recited in claim 8.

13. The fiber-reinforced sheet according to claim 12, wherein said individual fiber-reinforced plastic strands are spaced apart from each other by 0.1 to 1.0 mm.

14. The fiber-reinforced sheet according to claim 12, wherein said fixing fiber material is in a thread shape comprising glass fiber or organic fiber.

* * * * *